United States Patent
Harsch

(10) Patent No.: US 12,273,259 B2
(45) Date of Patent: Apr. 8, 2025

(54) METHOD FOR OPERATING A COMMUNICATION SYSTEM, AND COMMUNICATION SYSTEM

(71) Applicant: SIEMENS MOBILITY GMBH, Munich (DE)

(72) Inventor: Waldemar Harsch, Hannover (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 16/964,290

(22) PCT Filed: Dec. 27, 2018

(86) PCT No.: PCT/EP2018/097015
§ 371 (c)(1),
(2) Date: Jul. 23, 2020

(87) PCT Pub. No.: WO2019/145109
PCT Pub. Date: Aug. 1, 2019

(65) Prior Publication Data
US 2021/0014149 A1 Jan. 14, 2021

(30) Foreign Application Priority Data
Jan. 23, 2018 (DE) ............. 10 2018 201 011.0

(51) Int. Cl.
*H04L 45/02* (2022.01)
(52) U.S. Cl.
CPC ................ *H04L 45/026* (2013.01)

(58) Field of Classification Search
CPC ........ H04W 84/18; H04L 41/12; H04L 45/02; H04L 45/00; H04L 45/04; H04L 41/04; H04L 45/026
See application file for complete search history.

(56) References Cited

U.S. PATENT DOCUMENTS

| | | | | |
|---|---|---|---|---|
| 6,816,495 B2* | 11/2004 | Nishikado | ............. | H04L 49/309 370/352 |
| 7,921,194 B2* | 4/2011 | Song | ................... | H04L 12/2809 709/223 |
| 8,415,831 B1* | 4/2013 | Hayes, Jr. | ............ | H05K 7/1492 307/66 |
| 9,026,664 B2* | 5/2015 | Zarka | .................. | H04L 67/2833 709/227 |

(Continued)

*Primary Examiner* — Hassan A Phillips
*Assistant Examiner* — Prenell P Jones
(74) *Attorney, Agent, or Firm* — Laurence A. Greenberg; Werner H. Stemer; Ralph E. Locher

(57) ABSTRACT

A communication system has a first communication unit and at least one second communication unit. A method for operating the communication system is particularly powerful and at the same time comparably simple to implement. Logical communication connections between the first communication unit and the at least one second communication unit are used for data transmission. At least one keep-alive message, which contains at least one piece of information in respect of a plurality of the logical communication connections used for the data transmission, is transmitted between the first communication unit and the at least one second communication unit via one additional logical communication connection. There is also described a corresponding communication system.

17 Claims, 2 Drawing Sheets

(56) References Cited

U.S. PATENT DOCUMENTS

Figure 1:
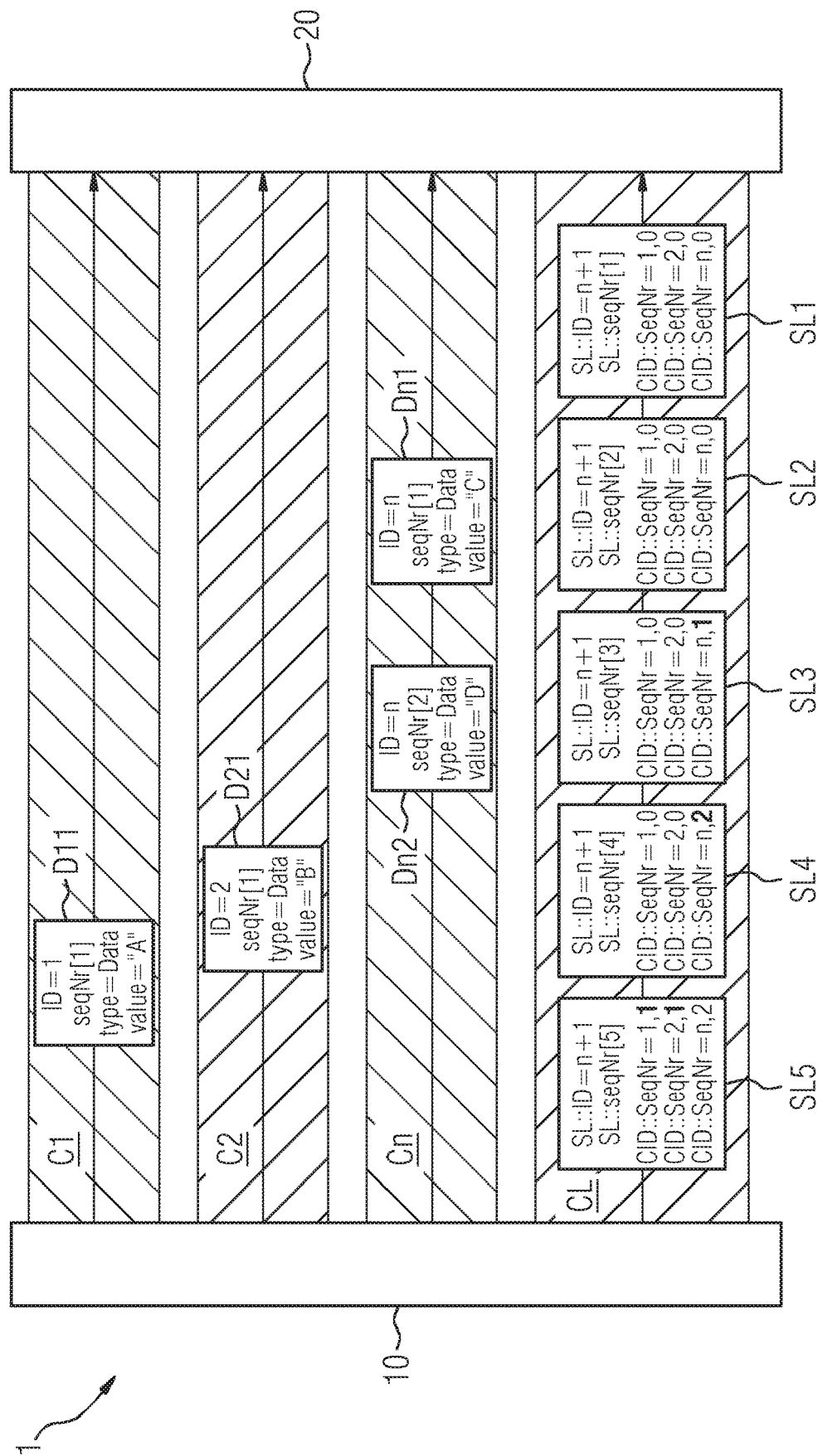

| | | | |
|---|---|---|---|
| 9,851,729 B2* | 12/2017 | Mucignat | G05D 23/193 |
| 11,032,106 B1* | 6/2021 | Nautiyal | H04L 43/10 |
| 2002/0037736 A1* | 3/2002 | Kawaguchi | H04W 4/08 |
| | | | 455/518 |
| 2002/0071437 A1* | 6/2002 | Nishikado | H04L 49/309 |
| | | | 370/395.63 |
| 2003/0177228 A1 | 9/2003 | Vigouroux et al. | |
| 2008/0205394 A1* | 8/2008 | Deshpande | H04L 12/185 |
| | | | 370/390 |
| 2008/0209068 A1* | 8/2008 | Herzog | H04L 61/2553 |
| | | | 709/232 |
| 2009/0067407 A1* | 3/2009 | Jia | H04L 12/189 |
| | | | 370/350 |
| 2009/0175282 A1* | 7/2009 | Babin | H04W 52/287 |
| | | | 370/401 |
| 2009/0197589 A1* | 8/2009 | Kitazoe | H04W 76/25 |
| | | | 455/422.1 |
| 2010/0023582 A1* | 1/2010 | Pedersen | H04L 67/06 |
| | | | 709/203 |
| 2010/0124196 A1* | 5/2010 | Bonar | H04W 16/16 |
| | | | 455/445 |
| 2012/0008536 A1* | 1/2012 | Tervahauta | H04W 76/25 |
| | | | 370/311 |
| 2013/0044678 A1* | 2/2013 | Qu | H04W 52/244 |
| | | | 370/328 |
| 2013/0286942 A1* | 10/2013 | Bonar | H04W 16/16 |
| | | | 370/328 |
| 2014/0189392 A1* | 7/2014 | Bodio | G06F 1/3203 |
| | | | 713/320 |
| 2014/0211637 A1 | 7/2014 | Sawal et al. | |
| 2014/0211764 A1* | 7/2014 | Sundararajan | H04W 56/00 |
| | | | 370/336 |
| 2014/0226464 A1* | 8/2014 | Kumar | H04L 45/28 |
| | | | 370/225 |
| 2014/0254447 A1* | 9/2014 | Backholm | H04L 67/14 |
| | | | 370/311 |
| 2015/0092554 A1* | 4/2015 | Mochizuki | H04W 28/08 |
| | | | 370/235 |
| 2016/0150589 A1* | 5/2016 | Zhao | H04L 67/14 |
| | | | 370/328 |
| 2016/0191364 A1* | 6/2016 | Ajitomi | H04L 43/10 |
| | | | 709/224 |
| 2016/0226928 A1* | 8/2016 | Park | H04W 4/06 |
| 2016/0337426 A1* | 11/2016 | Shribman | H04L 65/65 |
| 2017/0105243 A1* | 4/2017 | Howry | H04L 67/145 |
| 2017/0251026 A1* | 8/2017 | Straub | H04L 65/612 |
| 2017/0264395 A1* | 9/2017 | Wakabayashi | H04L 1/1819 |
| 2018/0070257 A1* | 3/2018 | Mochizuki | H04W 24/10 |
| 2018/0095855 A1* | 4/2018 | Sanakkayala | G06F 11/3006 |
| 2018/0150299 A1* | 5/2018 | Balle | G06F 11/3006 |
| 2018/0288167 A1* | 10/2018 | Dutta | H04L 43/103 |
| 2019/0182890 A1* | 6/2019 | Jeong | H04W 4/40 |
| 2019/0215861 A1* | 7/2019 | Son | H04W 72/23 |
| 2019/0222619 A1* | 7/2019 | Shribman | H04L 65/65 |
| 2020/0154504 A1* | 5/2020 | Backholm | H04L 67/14 |
| 2020/0196356 A1* | 6/2020 | Ko | H04W 74/0833 |
| 2021/0084642 A1* | 3/2021 | Kim | H04W 72/51 |
| 2021/0367660 A1* | 11/2021 | Jo | H04W 72/53 |

\* cited by examiner

METHOD FOR OPERATING A COMMUNICATION SYSTEM, AND COMMUNICATION SYSTEM

BACKGROUND OF THE INVENTION

FIELD OF THE INVENTION:

In the course of operating a communication system, the situation often arises whereby a plurality of communication units, for instance in the form of corresponding devices, are connected to one another via one or more communication networks. Depending on the respective circumstances and requirements, keep-alive messages may in this case be sent cyclically between the communication units in the course of the communication in order to detect failure. These keep-alive messages may also be referred to as heartbeat messages, alive messages or life sign messages and are usually used to inform the respective communication partner that a communication unit transmitting the respective keep-alive message is still responsive. There may furthermore be provision for the possibility of the communication unit receiving the keep-alive message being given the option of checking, on the basis of information contained in the keep-alive message, whether all of the preceding messages, that is to say in particular those by way of which a data transmission of payload data took place, were received.

Corresponding keep-alive messages may preferably be transmitted between all of the communication units of a communication system that have communication relationships with one another. If no valid message is received for a defined time interval, then the respective receiving communication unit may assume that the communication partner, that is to say the respective transmitting communication unit, is no longer responsive or else the communication connection is subject to interference. This allows the receiving communication unit itself to derive and to implement a required or appropriate response. A corresponding response may be for example that the communication system or the overall system containing the communication system adopts a safe state.

If a communication unit then has to generate corresponding keep-alive messages or life cycles to a large number of other communication units, that is to say for example in a 1-to-n relationship, this may lead to problems. By way of example, reference is made at this juncture to signal box logic or a central controller of a signal box that has monitored message paths with a large number of decentralized controllers or elements of the signal box and generates a keep-alive message for each of these decentralized controllers. Furthermore, if the central controller likewise receives corresponding keep-alive messages from the decentralized controllers, then there is furthermore the need to receive and to evaluate these on the part of the central controller. Managing a large number of corresponding entities and for example respectively calculating code security attachments and security attachments may in this case lead to a considerable reduction in efficiency or performance of the communication system. This means that ultimately either the response time of the overall system is reduced or it is necessary to split the logic over several systems. This however impairs the scalability of the communication system. Furthermore, this generally leads to a more complex structure of the communication system and to higher costs.

SUMMARY OF THE INVENTION

The present invention is based on the object of specifying a particularly efficient and at the same time comparatively easy-to-implement method for operating a communication system.

This object is achieved according to the invention by a method for operating a communication system containing a first communication unit and at least one second communication unit, wherein logic communication connections are used for data transmission between the first communication unit and the at least one second communication unit and at least one joint keep-alive message is transmitted via a further logic communication connection between the first communication unit and the at least one second communication unit, which joint keep-alive message contains at least one respective item of information relating to a plurality of the logic communication connections used for data transmission.

According to the first step of the method according to the invention for operating a communication system containing a first communication unit and at least one second communication unit, logic communication connections are thus used for data transmission between the first communication unit and the at least one second communication unit. This means that there are a plurality of logic communication connections between the first communication unit and the at least one second communication unit. In the event of a plurality of second communication units, this may in particular mean that a logic communication connection is used between the first communication unit and each of the second communication units. The term "logic communication connection" in this case expresses the fact that the physical or protocol-based implementation of the communication connections as such is arbitrary.

According to the second step of the method according to the invention, at least one joint keep-alive message is transmitted via a further logic communication connection between the first communication unit and the at least one second communication unit. In this case, the joint keep-alive message contains or comprises at least one respective item of information relating to a plurality of the logic communication connections used for data transmission. The method according to the invention is thus in particular distinguished in that a separate, further logic communication connection is used to transmit keep-alive messages, this further logic communication connection being provided in addition to the logic communication connections that are used for the actual data transmission, that is to say to transmit payload data. The keep-alive message transmitted via the further logic communication connection is in this case not a normal keep-alive message relating to an individual logic communication connection, but rather a joint keep-alive message. This contains at least one respective item of information relating to a plurality of the logic communication connections used for data transmission. The plurality of logic communication connections are preferably in this case all of the logic communication connections that are used for data transmission between the first communication unit and the at least one second communication unit. It is furthermore however also possible for example for the logic communication connections used for data transmission to be divided into groups that each comprise a plurality of logic communication connections and the at least one joint keep-alive message is transmitted in each case for each of these groups.

Regardless of the respective implementation, the joint keep-alive message functionally replaces a multiplicity of individual keep-alive messages, that is to say serves as a keep-alive message with regard to the plurality of logic communication connections. To this end, just one joint keep-alive message is generated and sent for a multiplicity of logic communication connections.

The at least one joint keep-alive message is preferably transmitted cyclically. In this case, the cycle time, that is to say the respective time interval between two consecutive joint keep-alive messages, may be selected depending on the respective circumstances and requirements.

The first communication unit and the at least one second communication unit, in the context of the method according to the invention, may be entities, devices, components or apparatuses of any kind. In this case, the communication units, depending on the respective implementation and application, may serve either essentially for communication purposes or else perform or carry out other functions or tasks in addition to communication.

The method according to the invention offers the advantage of saving on resources to a considerable extent. This leads to the communication system according to the invention largely maintaining its efficiency even in the case of a large number of logic communication connections in relation to which keep-alive message monitoring is performed. The result of this is that the number of second communication units able to be coupled to the first communication unit is able to be increased considerably in comparison with the case of transmitting individual keep-alive messages for each of the logic communication connections. It has thus proven that, depending on the respective application and the respective boundary conditions, sending and monitoring keep-alive messages may exert a very high performance requirement on a computer or a controller. This requirement is able to be reduced considerably by the method according to the invention. For instance, using the example mentioned at the outset of a central controller of a signal box, which controller is connected to second communication units in the form of decentralized controllers via logic communication connections, it was possible to demonstrate that the performance requirement in connection with keep-alive messages is able to be roughly halved using the method according to the invention. In this case, in one exemplary implementation for the case of decentralized controllers connected via the RaSTA (Rail Safe Transport Application) protocol, it was possible to use one joint keep-alive message for a large number of logic communication connections in the form of corresponding RaSTA connections.

According to the above explanations, the method according to the invention is able to considerably increase the efficiency of the communication system. The method according to the invention may furthermore advantageously be implemented with comparatively little expenditure and low costs.

The at least one joint keep-alive message may be transmitted in principle via the further logic communication connection in any way known per se, for example via unicast.

According to one particularly preferred embodiment of the method according to the invention, the at least one joint keep-alive message is transmitted by way of a publish-subscribe mechanism, via multicast and/or via broadcast. This is advantageous since said mechanism or said transmission methods are proven methods for transmitting a message in an efficient and resource-saving manner. This is in particular true for the case in which the joint keep-alive message is transmitted by the first communication unit to a plurality of second communication units.

According to a further particularly preferred development of the method according to the invention, the at least one joint keep-alive message is transmitted to the at least one second communication unit. This offers the advantage that just one joint keep-alive message needs to be generated by the first communication unit with regard to the plurality of logic communication connections used for data transmission and transmitted to the at least one second communication unit.

As an alternative or in addition to the embodiment described above, the method according to the invention may advantageously also be developed such that the at least one joint keep-alive message is transmitted to the first communication unit. In this case, the information contained in the joint keep-alive message thus originates from the second communication unit or the second communication units. This thus advantageously results in the possibility that the second communication units also transmit keep-alive messages to the first communication unit in a particularly efficient and effective manner. In the case of a plurality of second communication units, the joint keep-alive message may in this case be formed or generated by one of the second communication units or another component of the communication system.

In order to avoid any misunderstandings, it is pointed out that joint keep-alive messages transmitted to the at least one second communication unit and joint keep-alive messages transmitted to the first communication unit will generally have a similar or identical structure, that is to say may each be identical in terms of the information that they contain, but differ or may differ elsewhere in terms of the transmission direction and potentially also in terms of other properties.

The method according to the invention may also advantageously be designed such that, in the case of a plurality of second communication units between the first communication unit and each of the second communication units, in each case precisely one or at least one of the logic communication connections is used for data transmission. This is advantageous since in this case the joint keep-alive message allows efficient and effective monitoring of the in each case at least one logic communication connection between the first communication unit and the second communication units.

As an alternative to the above-described embodiment, the method according to the invention may advantageously also be developed such that, in the case of a single second communication unit between the first communication unit and the second communication unit, the plurality of logic communication connections are used for data transmission. According to this preferred embodiment, the joint keep-alive message thus relates to the logic communication connections between the first communication unit and the one second communication unit. In this case too, this preferably results in the abovementioned advantages with regard to the performance and efficiency of the method.

According to a further particularly preferred embodiment of the method according to the invention, the logic communication connections are assigned to third communication units and the second communication unit is used as a gateway between the first communication unit and the third communication units. This means that the third communication units are connected or are able to be connected to the first communication unit with the interposition of the gateway. In this case, the second communication unit in the form of the gateway may for example compile or form a joint keep-alive message to be transmitted to the first communication unit.

According to a further particularly preferred embodiment of the method according to the invention, a protocol conversion is performed by the second communication unit. In this case, a first protocol is used for the communication between the first communication unit and the second communication unit in the form of the gateway and a second protocol is used for the data transmission or communication between the gateway and the third communication units. Protocol-based decoupling of the first communication unit and the third communication units is thus advantageously achieved by way of the gateway.

The method according to the invention may preferably furthermore also be designed such that the at least one joint keep-alive message is evaluated at the receiver side and the contained information relating to the respective logic communication connection used for data transmission is extracted. This is advantageous since the contained information relating to the logic communication connections is thus extracted from the joint keep-alive message for each of the plurality of these logic communication connections and possibly evaluated or processed further. In this case, extracting the respective information involves an evaluation step on the receiver side. This evaluation is therefore consequently able to be used to detect whether a functionality or responsiveness of the respective communication partner is still present with regard to the logic communication connections in question.

The at least one joint keep-alive message may, with regard to the plurality of logic communication connections used for data transmission, for example contain in each case at least one item of information in the form of a timestamp of a last transmitted data message and/or of a timestamp of a last received data message.

As an alternative or in addition thereto, the method according to the invention may preferably also be developed such that the at least one joint keep-alive message, with regard to the plurality of logic communication connections used for data transmission, contains in each case at least one item of information in the form of a sequence number of a data transmission last performed via the respective logic communication connection. As a result of the respective sequence number, it is advantageously possible, on the receiver side, to check, with regard to the respective logic communication connection, whether or not all of the preceding data transmissions or messages were received.

In order to be able to perform a corresponding check, it is necessary for the sequence numbers contained in the joint keep-alive message to be able to be assigned to the respective logic communication connection to which they relate.

To this end, the method according to the invention may firstly be developed such that the at least one joint keep-alive message additionally contains, for each of the sequence numbers, a connection indicator by way of which the respective one of the sequence numbers is assigned to the respective logic communication connection. This means that, in this case, the respective sequence number may be assigned to the respective logic communication connection on the basis of the respective connection indicator on the receiver side, without additional information. This offers the advantage that it is not necessary to provide and manage any corresponding additional information.

As an alternative to the embodiment described above, the method according to the invention may advantageously also be designed such that the respective one of the sequence numbers is assigned to the respective logic communication connection on the receiver side with the incorporation of configuration data. In this case, it is advantageously not necessary to specify a connection indicator for each of the sequence numbers in the at least one joint keep-alive message. In order to assign the respective one of the sequence numbers to the respective logic communication connection, configuration data are instead incorporated on the receiver side. These configuration data thus directly or indirectly specify which sequence number relates to which logic communication connection.

With regard to the communication system, the present invention is based on the object of specifying a communication system that supports a particularly efficient and at the same time comparatively easy-to-implement method for operating the communication system.

This object is achieved according to the invention by a communication system containing a first communication unit and at least one second communication unit, wherein a plurality of logic communication connections are provided for data transmission between the first communication unit and the at least one second communication unit, a further logic communication connection is provided between the first communication unit and the at least one second communication unit and the communication system is configured so as to transmit at least one joint keep-alive message via the further logic communication connection, which joint keep-alive message contains at least one respective item of information relating to a plurality of the logic communication connections used for data transmission.

The advantages of the communication system according to the invention correspond to those of the method according to the invention, such that reference is made in this respect to the corresponding above explanations.

According to one particularly preferred development of the communication system according to the invention, the first communication unit is a central controller of a signal box and the at least one second communication unit is a decentralized controller of the signal box. This is advantageous since, in the context of increasing digitization, there is increasingly often the need to connect a multiplicity or a large number of decentralized controllers of signal boxes to a respective central controller of the signal box in terms of communication. In this case, communication normally takes place by way of common communication methods such as for example TCP/IP. The communication system according to the invention in this case makes it possible for the number of keep-alive messages or life cycles to be generated to be able to be reduced considerably by using the joint keep-alive message. As a result, the efficiency of the signal box is increased or the required power is able to be achieved using less sophisticated hardware means, as a result of which the overall system is simplified and costs are reduced.

The communication system according to the invention may preferably also be developed such that the communication system is configured so as to perform the method according to one of the above-described preferred developments of the method according to the invention. With regard to the advantages of this preferred development of the communication system according to the invention as well, reference is made to the corresponding explanations in connection with the respective preferred embodiment of the method according to the invention.

The invention is explained in more detail below with reference to exemplary embodiments.

BRIEF DESCRIPTION OF THE SEVERAL
VIEWS OF THE DRAWING

Figure 2:
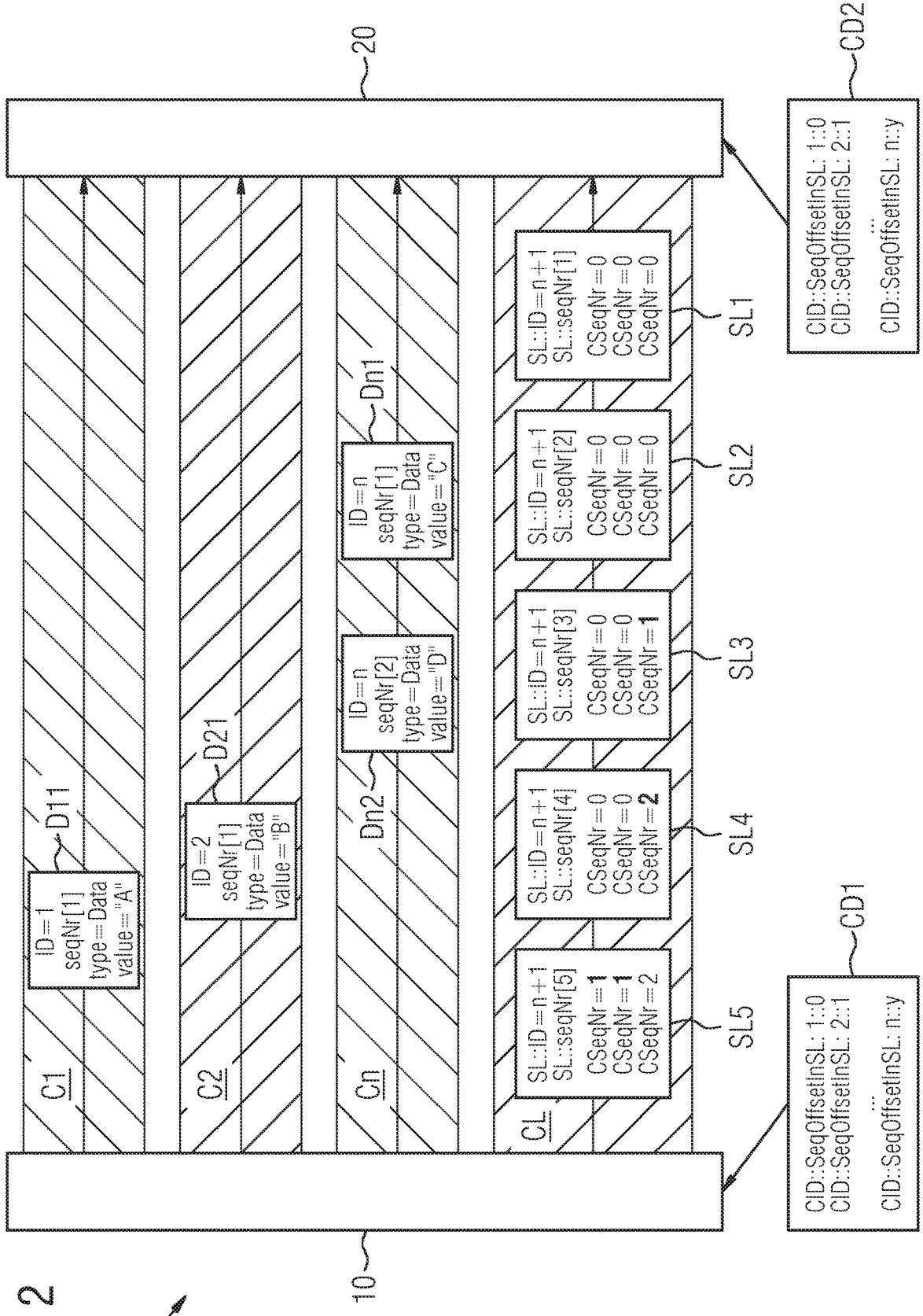

FIG. 1 shows, in a schematic sketch for explaining a first exemplary embodiment of the method according to the invention, a first exemplary embodiment of the communication system according to the invention, and FIG. 2 shows, in a schematic sketch for explaining a second exemplary embodiment of the method according to the invention, a second exemplary embodiment of the communication system according to the invention.

DETAILED DESCRIPTION OF THE INVENTION

The same reference signs are used for the same components in the figures for the sake of clarity.

FIG. 1 shows, in a schematic sketch for explaining a first exemplary embodiment of the method according to the invention, a first exemplary embodiment of the communication system according to the invention. In this case, a first communication unit 10 and a second communication unit 20 are illustrated in the form of a sequence diagram, between which communication units there are logic communication connections C1, C2 and Cn. In this case, the reference "Cn" indicates that any desired number n of logic communication connections C1, C2, Cn may be involved—deviating from the illustration of FIG. 1.

The logic communication connections C1, C2, Cn in FIG. 1 are illustrated in hatched form. This serves for better discernibility and differentiation, but is not intended to indicate any physical design or form of the logic communication connections C1, C2, Cn.

The logic communication connections C1, C2, Cn are used for data transmission between the first communication unit 10 and the second communication unit 20. This is indicated in FIG. 1 by corresponding data messages or data packets D11, D21, Dn1 and Dn2. In this case, the reference "Dnm" of the data message expresses that fact that the mth data message or data transmission via the nth logic communication connection C1, C2, Cn is involved.

In the context of the described exemplary embodiment, it is assumed that the data messages D11, D21, Dn1, Dn2 in question are transmitted by the first communication unit 10 to the second communication unit 20. The corresponding horizontal arrangement of the data messages D11, D21, Dn1, Dn2 in this case indicates the temporal sequence of the transmission. This means that, in the temporal sequence, the data messages Dn1 and Dn2 are firstly transmitted via the logic communication connection Cn and then the data message D21 is transmitted via the logic communication connection C2. Finally, the data message D11 is then transmitted via the logic communication connection C1.

The data messages D11, D21, Dn1, Dn2 each contain an identity "ID" whose value identifies the respective logic communication connection C1, C2, Cn. Furthermore provided is a sequence number "seqNr" that identifies which data message D11, D21, Dn1, Dn2 is involved via the respective logic communication connection C1, C2, Cn in each case (or in general makes it possible to distinguish between the data messages transmitted via the respective logic communication connection). In order to identify the message type, that is to say in order to identify the data messages D11, D21, Dn1, Dn2 as such for the transmission of payload data, the data messages D11, D21, Dn1, Dn2 each specify "type=Data". The actual data content, that is to say the payload data that are transmitted in each case, is specified in the data messages D11, D21, Dn1, Dn2 by specifying the type "value="A"". In this case, the respective content "A", "B", "C" or "D" stands for respective data content of any kind. The data messages D11, D21, Dn1, Dn2 may thus in principle in particular have any desired length and any desired content.

It is able to be seen in the exemplary embodiment of FIG. 1 that possibly no data messages are transmitted for a relatively long time between the transmission of the data messages D11, D21, Dn1, Dn2. This means that the second communication unit 20 with regard to the respective logic communication connection C1, C2, Cn possibly does not have any information for a correspondingly long time as to whether the first communication unit 10 is still responsive and the respective logic communication connection C1, C2, Cn is available.

In this situation, keep-alive messages would then be transmitted to the second communication unit 20 by the first communication unit 10 cyclically or at regular time intervals in a normal procedure with regard to a monitored connection. In the exemplary embodiment according to FIG. 1, this could for example take the form whereby three corresponding keep-alive messages or life cycles are transmitted via the logic communication connection C1 prior to the data message D11 and a further corresponding keep-alive message is transmitted following the data message D11. Accordingly, three keep-alive messages relating to the second logic communication connection C2 could also for example be transmitted prior to the data message D21 and a further one could be transmitted following the transmission of the data message D21. Given a similar or identical cycle, in the case of the logic communication connection Cn, a keep-alive message could for example be transmitted prior to the two data messages Dn1 and Dn2 and two further corresponding keep-alive messages could be transmitted following them. Imagining now that the number n, that is to say the number of logic communication connections between the first communication unit and the second communication unit 20, will often be considerably greater than 3, then it becomes clear, in the described procedure, that the first communication unit 10 would have to be operated with a considerable expenditure for generating and sending corresponding keep-alive messages for each of the logic communication connections C1, C2, Cn. This also applies similarly with regard to the second communication unit 20 with regard to receiving and evaluating these keep-alive messages. Therefore, this may result in considerable restrictions on the performance of the communication system 1.

In order to avoid corresponding restrictions or to accordingly increase the performance of the communication system 1, the exemplary embodiment of the communication system 1 according to the invention according to FIG. 1 dispenses with corresponding individual keep-alive messages transmitted between the first communication unit 10 and the second communication unit 20 via the respective logic communication connection C1, C2, Cn. Instead of this, joint keep-alive messages SL1, SL2, SL3, SL4 and SL5 are transmitted via a further logic communication connection CL between the first communication unit 10 and the second communication unit 20. These joint keep-alive messages, according to the exemplary embodiment of FIG. 1, first of all contain an item of information "SL::ID" whose value specifies that this is the further logic communication connection with the ID n+1. By virtue of a further parameter "SL::seqNr", the joint keep-alive messages SL1, SL2, SL3, SL4, SL5 each contain a sequence number that specifies the order of the joint keep-alive messages SL1, SL2, SL3, SL4 and SL5. The joint keep-alive messages SL1, SL2, SL3, SL4, SL5 furthermore contain, with regard to the logic communication connections C1, C2, Cn used for data transmission, at least one respective item of information. To this end, a connection indicator "CID" in the form of an ID of the respective logic communication connection is in each case first of all specified behind the specification "CID::SeqNr". By virtue of this connection indicator "CID", an assignment to the respective logic communication connection C1, C2, Cn is thus possible. This is then followed, separated by a comma, by a sequence number "SeqNr" of a data transmission last performed via the respective logic communication connection C1, C2, Cn. With regard to the joint keep-alive message SL1, SL2, SL3, SL4, SL5, this specifically means that the first sequence number relates to the first logic communication connection C1, the second sequence number relates to the second logic communication connection C2 and the third (or generally nth) sequence number relates to the logic communication connection Cn.

In the situation illustrated in FIG. 1, after no data messages D11, D21, Dn1, Dn2 have yet been transmitted at the time of transmission of the joint keep-alive message SL1, the corresponding sequence numbers in the joint keep-alive message SL1 each have the value 0.

Considering now for example the fifth illustrated joint keep-alive message SL5, then it becomes clear that the sequence number for each of the logic communication connections C1, C2, Cn has increased. This means that, in the meantime, the data message D11 was transmitted via the first logic communication connection C1 and the data message D21 was transmitted via the second logic communication connection C2. The sequence numbers for the logic communication connections C1, C2 in question in the joint keep-alive message SL5 accordingly each have the value 1. With regard to the logic communication connection Cn, it is able to be seen that, at the time of transmission of the joint keep-alive message SL5, two data messages Dn1, Dn2 had already been transmitted. The corresponding sequence number in the joint keep-alive message SL5 accordingly has the value 2.

The transmission of the joint keep-alive messages SL1, SL2, SL3, SL4, SL5 by the first transmission unit 10 to the second transmission unit 20 may take place as such in accordance with any suitable communication method, that is to say for example by way of a publish-subscribe mechanism, via multicast and/or via broadcast. In this case, the corresponding transmission methods are expedient in particular in situations in which, unlike the simplified illustration in FIG. 1, a plurality of second communication units 20 are present, to which the joint keep-alive messages SL1, SL2, SL3, SL4, SL5 are to be transmitted.

In addition or as an alternative to the exemplary embodiment illustrated in FIG. 1, it would also be possible for joint keep-alive messages to be transmitted by the second communication unit 20 to the first communication unit 10. This could take place either likewise via the further logic communication connection CL or else via an additional further logic communication connection.

In the event that the communication system 1 comprises a plurality of second communication units 20, the data transmission between the first communication unit 10 and these second communication units may use in each case precisely one or in each case at least one of the logic communication connections C1, C2, Cn for data transmission.

In the case, illustrated in FIG. 1, of a single second communication unit 20, the logic communication connections C1, C2, Cn are used for data transmission between the first communication unit and the second communication unit. There is in this case the possibility that the logic communication connections C1, C2, Cn are assigned to third communication units that are not illustrated in FIG. 1 for the sake of clarity, such that the data messages D11, D21, Dn1, Dn2 transmitted via the respective logic communication connection C1, C2, Cn are ultimately determined for the respective third communication unit. In this case, the second communication unit 20 thus operates as a gateway between the first communication unit 10 and the third communication units. In this case, a protocol conversion may in particular be performed by the gateway in the form of the second communication unit 20. This means that the data transmission between the first communication unit 10 and the second communication unit 20 takes place in accordance with a first communication protocol and the data transmission between the second communication unit 20 and the third communication units takes place in accordance with a second communication protocol. In the event that the communication system 1 is a communication system of a signal box and the first communication unit 10 is a central controller of the signal box, the third communication units could be for example decentralized controllers of the signal box that may be connected for example to the second communication unit 20 in the form of the gateway via the RaSTA protocol.

Regardless of the respective implementation, the joint keep-alive messages SL1, SL2, SL3, SL4, SL5 may be evaluated at the receiver side, that is to say by the second communication unit 20. In the context of this evaluation, the contained information relating to the respective logic communication connection C1, C2, Cn used for data transmission, that is to say in this case the respective sequence number, may in particular be extracted. As a result, it is made possible for the second communication unit 20 to check that it has actually received all of the data messages D11, D21, Dn1, Dn2 dispatched by the first communication unit 10. For a corresponding check, it is necessary in this case for the sequence numbers to be able to be assigned to the respective logic communication connection C1, C2, Cn. As already described above, this takes place in the exemplary embodiment by virtue of the fact that the joint keep-alive messages SL1, SL2, SL3, SL4, SL5 each contain a connection indicator "CID" by way of which the respective sequence number is able to be assigned to the respective logic communication connection C1, C2, Cn. In this case, the sequence numbers and the connection indicators in the joint keep-alive messages SL1, SL2, SL3, SL4, SL5 are transmitted as payload in the respective data message D11, D21, Dn1, Dn2, that is to say the respective telegram.

In order to avoid any misunderstandings, it is emphasized at this juncture that the exemplary embodiment according to FIG. 1 merely sketches a small time excerpt by way of example. This means in particular that corresponding joint keep-alive messages SL1, SL2, SL3, SL4, SL5 are generally sent cyclically.

FIG. 2 shows, in a schematic sketch for explaining a second exemplary embodiment of the method according to the invention, a second exemplary embodiment of the communication system according to the invention. In this case, the illustration of FIG. 2 corresponds largely to that of FIG. 1. In contrast to FIG. 1, the joint keep-alive messages SL1, SL2, SL3, SL4, SL5 however do not have any connection indicators. This means that, for the joint keep-alive messages SL1, SL2, SL3, SL4, SL5, it is not initially possible to see as such the logic communication connection C1, C2, Cn to which the respective sequence number "CSeqNr" relates. In order then still to be able to perform a corresponding evaluation, the first communication unit 10 and the second communication unit 20 in the exemplary embodiment according to FIG. 2 have respective configuration files CD1, CD2 that define the order in which the sequence numbers "CSeqNr" are arranged or transmitted. This is performed by virtue of the fact that the offset "SeqOffsetInSL" for the respective sequence number "CSeqNr" is specified in the configuration files CD1, CD2 for each logic communication connection C1, C2, Cn, represented by a respective connection ID "CID". In the illustrated exemplary embodiment, this means that the sequence number "CSeqNr" for the first logic communication connection C1 is contained directly, without an offset, in the corresponding part of the joint keep-alive messages SL1, SL2, SL3, SL4, SL5 ("CID:: SeqOffsetInSL: 1::0"). With regard to the second logic communication connection C2, the corresponding offset is 1, and so on.

According to the above explanations in connection with the described exemplary embodiments of the communication system 1 according to the invention and of the method according to the invention, these are distinguished in particular in that keep-alive messages or state information are transmitted for a multiplicity of logic communication connections C1, C2, Cn by way of joint keep-alive messages SL1, SL2, SL3, SL4, SL5 via a further logic communication connection CL. Depending on the respective circumstances and requirements, this may result in considerable advantages with regard to the performance of the communication system 1, wherein at the same time additional expenditure, in particular for additional hardware, is advantageously avoided.

The invention claimed is:

1. A method of operating a communication system having a first communication unit and at least one second communication unit, the method comprising:
using logic communication connections for performing a first task of a data transmission between the first communication unit and the at least one second communication unit; and
providing a further logic communication connection between the first communication unit and the at least one second communication unit, the further logic communication connection performing a second task of transmitting at least one joint keep-alive message via the further logic communication connection, the joint keep-alive message including at least one respective item of information for each logic communication connection of a plurality of the logic communication connections used for the data transmission;
wherein the further logic communication connection is not one of the logic communication connections;
wherein the further logic communication connection has a function that is different from functions of the logic communication connections for data transmission between the first communication unit and the at least one second communication unit, and
wherein the further logic communication connection is separate from the logic communication connections for data transmission between the first communication unit and the at least one second communication unit, and wherein the at least one joint keep-alive message is one of a plurality of joint keep-alive messages and the further logic communication connection is reserved for repeatedly transmitting one of the plurality of joint keep-alive messages,
wherein each joint keep-alive message, with regard to the plurality of logic communication connections used for the data transmission, includes, in each case as the at least one item of information, a sequence number of a data transmission last performed via the respective logic communication connection, and
wherein a check is performed with regard to the respective logic communication connection, whether or not all of the preceding data transmissions or messages were received.

2. The method according to claim 1, which comprises transmitting the at least one joint keep-alive message by way of at least one of a publish-subscribe mechanism, a multicast, or a broadcast.

3. The method according to claim 1, which comprises transmitting the at least one joint keep-alive message to the at least one second communication unit.

4. The method according to claim 1, which comprises transmitting the at least one joint keep-alive message to the first communication unit.

5. The method according to claim 1, wherein the at least one second communication unit is one of a plurality of second communication units, and the method comprises using in each case precisely one or at least one of the logic communication connections for the data transmission between the first communication unit and each of the second communication units.

6. The method according to claim 1, wherein the at least one second communication unit is precisely one second communication units, and the method comprises using the plurality of logic communication connections for the data transmission between the first communication unit and the second communication unit.

7. The method according to claim 6, which comprises assigning the logic communication connections to third communication units and using the second communication unit as a gateway between the first communication unit and the third communication units.

8. The method according to claim 7, which comprises performing a protocol conversion by the second communication unit.

9. The method according to claim 1, which comprises evaluating the at least one joint keep-alive message at a receiver side and extracting information contained therein that relates to the respective logic communication connection used for the data transmission.

10. The method according to claim 1, wherein the at least one joint keep-alive message additionally includes, for each of the sequence numbers, a connection indicator by way of which the respective one of the sequence numbers is assigned to the respective logic communication connection.

11. The method according to claim 1, wherein the respective one of the sequence numbers is assigned to the respective logic communication connection on the receiver side with the incorporation of configuration data.

12. A communication system, comprising:
a first communication unit and at least one second communication unit;
a plurality of logic communication connections configured for performing a first task of a data transmission between the first communication unit and the at least one second communication unit; and
a further logic communication connection between the first communication unit and the at least one second communication unit; and
said further logic communication connection configured for performing a second task of transmitting at least one joint keep-alive message, which joint keep-alive message includes at least one respective item of information for each logic communication connection of a plurality of the logic communication connections used for data transmission;

wherein the further logic communication connection is not one of the plurality of logic communication connections;

wherein said further logic communication connection has a function that is different from functions of said logic communication connections for data transmission between said first communication unit and said at least one second communication unit; and wherein the further logic communication connection is separate from the logic communication connections for data transmission between the first communication unit and the at least one second communication unit, and wherein the at least one joint keep-alive message is one of a plurality of joint keep-alive messages and the further logic communication connection is reserved for repeatedly transmitting one of the plurality of joint keep-alive messages;

wherein each joint keep-alive message, with regard to the plurality of logic communication connections used for the data transmission, includes, in each case as the at least one item of information, a sequence number of a data transmission last performed via the respective logic communication connection, and wherein a check is performed with regard to the respective logic communication connection, whether or not all of the preceding data transmissions or messages were received.

13. The communication system according to claim 12, wherein said first communication unit is a central controller of a signal box and said at least one second communication unit is a decentralized controller of the signal box.

14. The communication system according to claim 12, configured for transmitting data between the first communication unit and the at least one second communication unit via logic communication connections, and transmitting at least one joint keep-alive message via a further logic communication connection established between the first communication unit and the at least one second communication unit, wherein the joint keep-alive message includes at least one respective item of information relating to a plurality of the logic communication connections used for transmitting data.

15. The communication system according to claim 12, wherein the plurality of the logic communication connections used for data transmission are all logic communication connections used for data transmission.

16. The method according to claim 1, wherein the plurality of the logic communication connections used for data transmission are all logic communication connections used for data transmission.

17. A method of operating a communication system having a first communication unit and at least one second communication unit, the method comprising:

using logic communication connections for performing a first task of a data transmission between the first communication unit and the at least one second communication unit; and providing a further logic communication connection between the first communication unit and the at least one second communication unit, the further logic communication connection performing a second task of transmitting at least one joint keep-alive message via the further logic communication connection, the joint keep-alive message including a plurality of items of information, each one of the plurality of items of information including at least one respective item of information for each logic communication connection of the plurality of the logic communication connections used for the data transmission;

wherein the further logic communication connection is not one of the logic communication connections;

wherein the further logic communication connection has a function that is different from functions of the logic communication connections for data transmission between the first communication unit and the at least one second communication unit, wherein the further logic communication connection is separate from the logic communication connections for data transmission between the first communication unit and the at least one second communication unit, and wherein the at least one joint keep-alive message is one of a plurality of joint keep-alive messages and the further logic communication connection is reserved for repeatedly transmitting one of the plurality of joint keep-alive messages, wherein the at least one respective item of information, of each of the plurality of items of information of the joint keep-alive message, includes a sequence number of a data transmission last performed via the respective logic communication connection, and wherein a check is performed with regard to the respective logic communication connection, whether or not all of the preceding data transmissions or messages were received.

* * * * *